United States Patent [19]

Belisaire

[11] Patent Number: 5,029,908
[45] Date of Patent: Jul. 9, 1991

[54] CLIP FOR INSTANT CONNECTION DEVICE FOR A FLUID CONDUIT AND DEVICES HAVING SUCH A CLIP

[75] Inventor: Daniel Belisaire, Cesson-Sevigne, France

[73] Assignee: Legris SA, Rennes, France

[21] Appl. No.: 392,603

[22] Filed: Aug. 11, 1989

[30] Foreign Application Priority Data

Jan. 4, 1989 [FR] France .................... 89 00134
Jun. 22, 1989 [FR] France .................... 89 08501

[51] Int. Cl.⁵ .......................................... F16L 21/06
[52] U.S. Cl. .................... 285/323; 285/319; 285/340
[58] Field of Search ............ 285/340, 322, 323, 319, 285/308

[56] References Cited

U.S. PATENT DOCUMENTS

| 3,810,073 | 5/1974 | Zajac et al. ............ 285/319 X |
| 3,837,690 | 9/1974 | Fraser, Jr. et al. ............ 285/319 |
| 4,073,514 | 2/1978 | Pate ............ 285/340 X |
| 4,240,651 | 12/1980 | Mariaulle ............ 285/322 X |
| 4,431,216 | 2/1984 | Legris ............ 285/323 X |
| 4,440,424 | 4/1984 | Mode ............ 285/340 X |
| 4,508,369 | 4/1985 | Mode ............ 285/340 X |
| 4,676,533 | 0/0000 | Gerondale ............ 285/158 |
| 4,781,400 | 11/1988 | Cunningham ............ 285/319 X |
| 4,802,697 | 2/1989 | Bartholomew ............ 285/319 |
| 4,834,423 | 5/1989 | DeLand ............ 285/319 X |
| 4,951,975 | 8/1990 | Bartholomew ............ 285/319 X |

FOREIGN PATENT DOCUMENTS

| 0294948 | of 0000 | European Pat. Off. . |
| 0247214 | 12/1987 | European Pat. Off. . |
| 0268511 | 5/1988 | European Pat. Off. . |
| 8660033 | of 0000 | Fed. Rep. of Germany . |
| 2307154 | 8/1974 | Fed. Rep. of Germany ...... 285/319 |
| 8522062 | 1/1987 | Fed. Rep. of Germany . |
| 2335137 | 7/1977 | France ............ 285/323 |

Primary Examiner—Dave W. Arola
Assistant Examiner—Carol I. Bordas
Attorney, Agent, or Firm—Oblon, Spivak, McClelland, Maier & Neustadt

[57] ABSTRACT

An instant connection device for fluid conduits is provided having a general cylindrical configuration, with a base portion in the form of a ring and flexible jaws whose ends define an annular bearing surface and have on the inside a circular engagement edge. The clip is obtained from a metal sheet blank having a circular central portion extended by first and second evenly spaced lugs with radial axes, the blank being subjected to stamping operations. The clip is cheap and simple to manufacture. Furthermore, it is possible to associate therewith an elastomer block by moulding thereover forming a push ring and a seal.

13 Claims, 9 Drawing Sheets

CLIP FOR INSTANT CONNECTION DEVICE FOR A FLUID CONDUIT AND DEVICES HAVING SUCH A CLIP

BACKGROUND OF THE INVENTION

1. Field of the Invention

The present invention relates to metal clips used in instant connection devices for fluid conduits, particularly semi-rigid plastic material tubes. It also relates to instant connection devices having such a clip.

2. Description of the Related Art

Such a device is described in the French Patent Application No. 2 012 796 in the name of the present applicant. Its clip has a general cylindrical configuration, with a base portion in the form of a ring extended on one side by flexible jaws whose ends define an annular bearing surface offset outwardly and inwardly having a circular edge with a sharp angle. On the other hand, extending inwardly from the inlet thereof the device includes a first bore for receiving a stationary ring, a second bore for lodging a sealing joint and third and fourth bores for positioning an admitted tube, these four bores being stepped and concentric. The internal wall of the stationary ring has an inwardly diverging zone for cooperating with the annular bearing surface of the clip in order to tighten the jaws thereof when the clip is displaced outwardly and loosen them when the clip is displaced inwardly.

At the present time, clips are formed by undercutting, and the flexibility of the jaws is obtained by the choice of the material, generally brass, combined with the presence in the jaws of a portion of smaller thickness.

SUMMARY OF THE INVENTION

An object of the present invention is to provide a clip obtained using another method, so as to lower the cost thereof and to improve the performances, particularly the flexibility of the jaws.

According to the invention, the clip is obtained from a metal sheet blank comprising a central circular portion, extended at the periphery by first identical lugs with radial axes, spaced apart evenly and whose ends are indented in the form of an arc of a circle and second identical lugs with radial axes, disposed evenly between the first lugs and much shorter and narrower than the latter, said blank being subjected to stamping operations for forming both the ring-shaped portion of the clip in the central part of the blank and the jaws from said first lugs by bending them transversely and profiling them longitudinally so as to obtain a substantially rectilinear portion or tongue, a bent portion to form said bearing surface and an end portion slanted towards the centre, whose internal edge forms said circular edge, said second lugs being intended to form outwardly directed spurs about the clip.

BRIEF DESCRIPTION OF THE DRAWINGS

The invention will be better understood from the following explanations and the accompanying drawings in which.

DESCRIPTION OF THE PREFERRED EMBODIMENTS

In the drawings, the same numerical references have been used throughout to designate the same elements.

Figure 1:
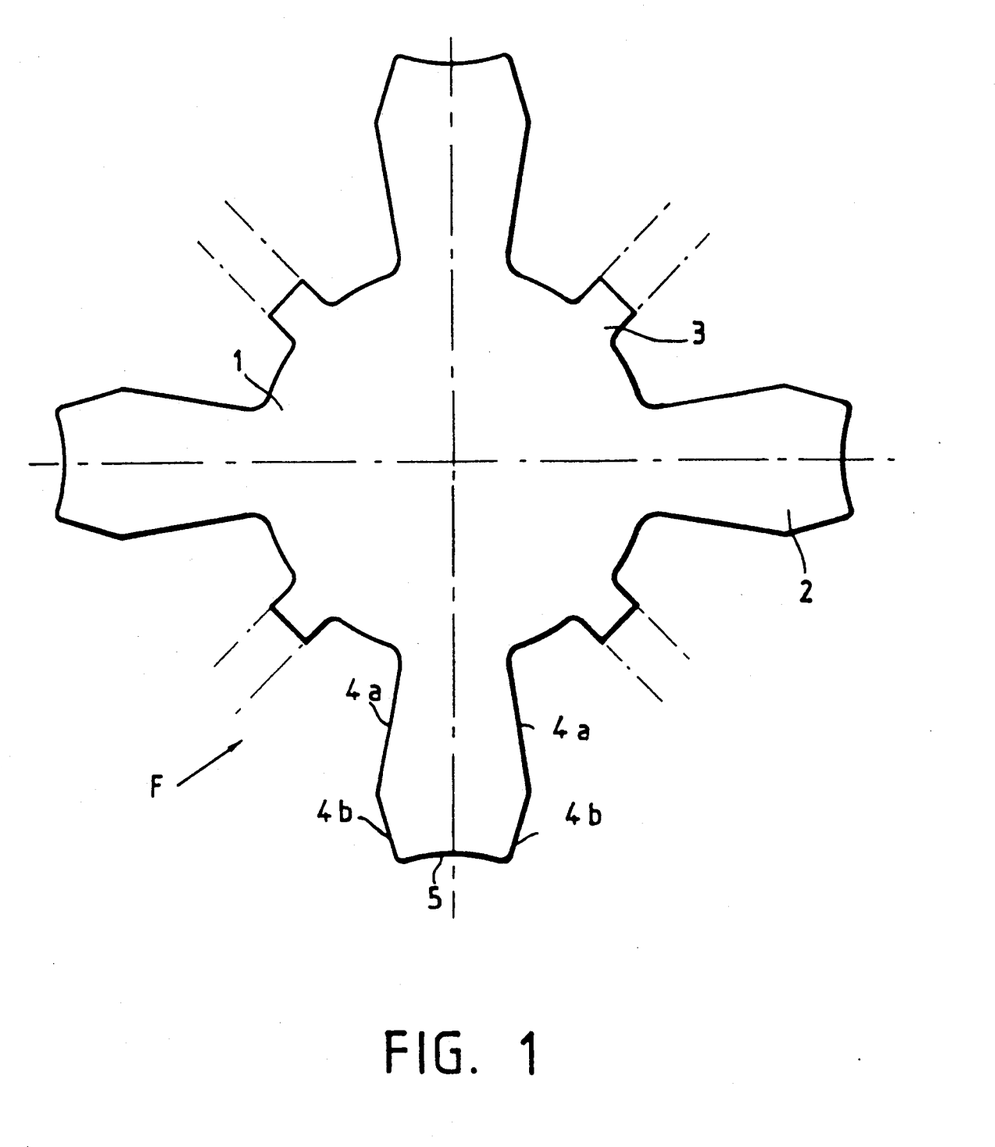
FIG. 1 is a top view of a blank from which a clip according to the invention is obtained.

The blank F shown in FIG. 1 is preferably cut from a stainless steel metal sheet. It has a circular portion 1 with, extending therefrom, four main lugs 2 which are identical and evenly spaced apart, and four secondary lugs 3 which are identical and disposed with even spacing between the main lugs 2. The lateral sides of each lug 2 form two segments 4a and 4b. Segments 4a are divergent outwardly and segments 4b are convergent, so that each lug 2 has a zone of larger width near its end 5 which is cut in the form of an arc of a circle.

The secondary lugs 3 are much shorter and narrower than lugs 2.

Figure 2:
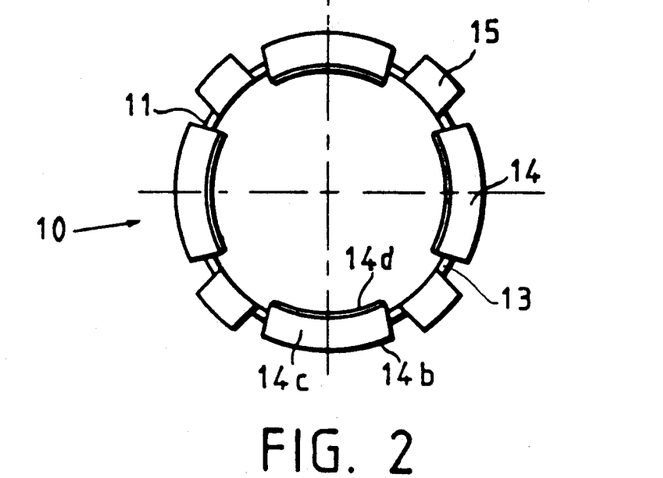
FIG. 2 is an end view of a clip obtained with the blank of FIG. 1.
Figure 3:
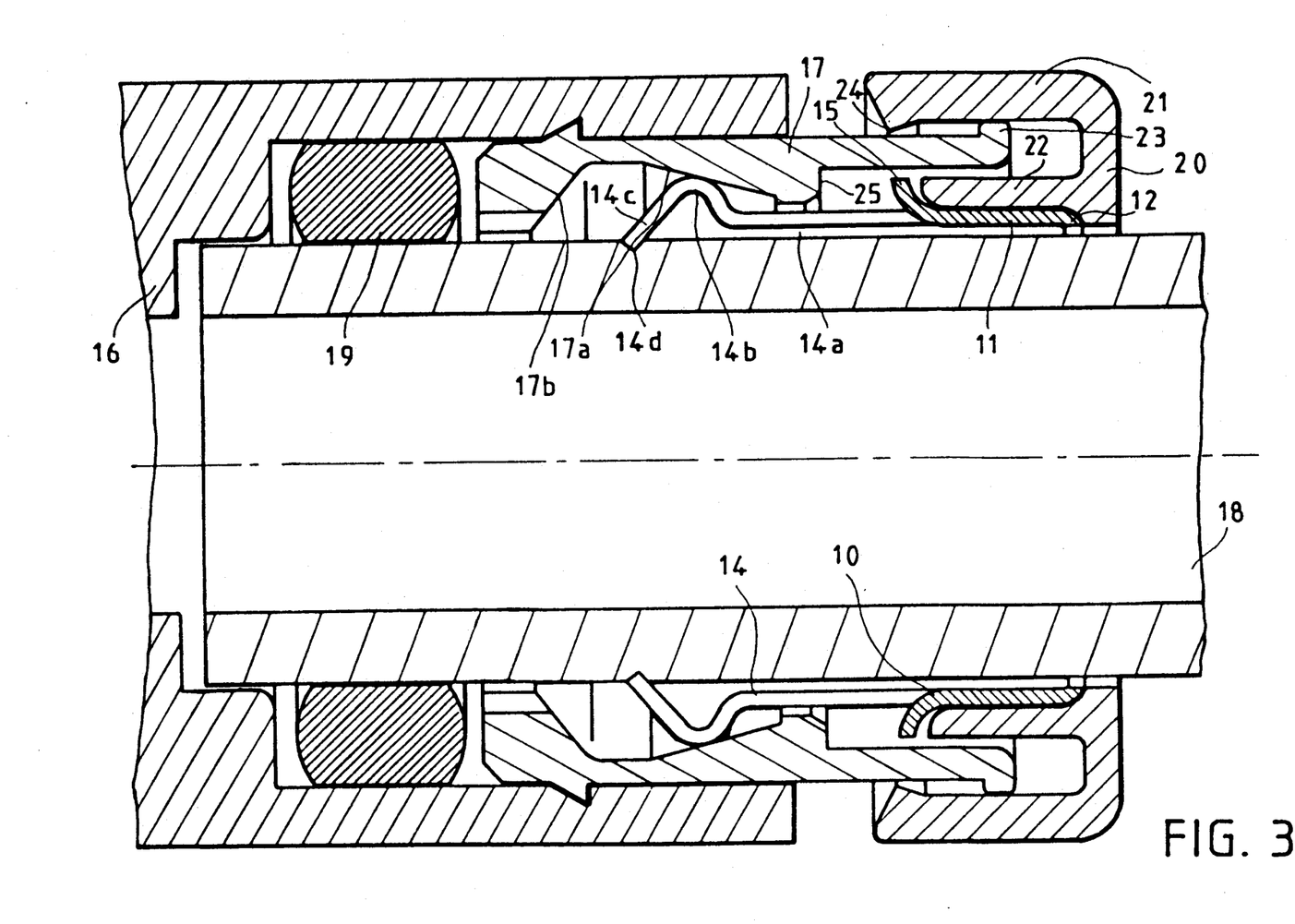
FIG. 3 is an axial sectional view of an instant connector provided with the clip of FIG. 2.

The blank is transformed by stamping so as to obtain the clip 10 shown in FIGS. 2 and 3. Clip 10 comprises a base portion 11 in the form of a ring whose external edge 12 is slightly constricted inwardly, FIG. 3. The internal edge 13 of base 11 is extended by jaws 14 formed from lugs 2 and curved transversely. Jaws 14 have a practically rectilinear portion or tongue 14a, a bent portion, substantially at the level of their zone of greatest width, and forming an annular bearing surface 14b offset outwardly, then an end portion 14c directed obliquely inwardly. The combined effect of the curve of jaws 14 and the divergent form of their tongues 14a divides them into a flexible portion near base 11 and a much more rigid portion towards their end. The latter is cut at right angles so as to form a circular internal engagement edge 14d. By the slant of the end portion 14d, that of the external lip of edge 14d can be determined.

Between jaws 14, spurs 15, obtained from lugs 3, project outwardly substantially at right angles.

In FIG. 3, clip 10 is shown in a connector 16. It is fitted inside a socket 17, the latter being fitted in the orifice of connector 16. Socket 17 has on the inside a bore for receiving spurs 15 and base 11 of the clip, a constricted portion at the level of tongues 14a of the jaws and a divergent zone forming a conical bearing surface 17a on which bears the bent portion 14b of jaws 14. In accordance with the teaching of the patent application 2 012 796, the angle at the centre formed by the external lip of the edge 14d may be chosen equal to about four times that of the conical bearing surface 17a of socket 17, by giving to the end portion 14c of the jaws an adequate obliqueness.

To fit a tube 18 into connector 16 it is sufficient to push it beyond seal 19, FIG. 3, followed by an outward tractive force. Under the effect of the latter, clip 10 is driven with tube 18 and jaws 14 are tightened because of the progression of the bent portions 14b on the conical bearing surface 17a of socket 17. Edges 14d penetrate into the material of tube 18 and provide firm engagement.

Clip 10 may be pushed inside connector 16, to be slackened by means of a push ring 20. Ring 20 has a U section, so as to cover the external edge of socket 17 and forms an external ring 21 and an internal ring 22 penetrating into socket 17. Ring 21 has on the inside an internal sliding surface for ring 20 on the collar shaped edge 23 of socket 17, such sliding being limited outwardly by an internal edge 24. The internal periphery of ring 20 mates with the shape of base 11 of clip 10 while overlapping its constricted edge 12, the edge of ring 22 being in contact with spurs 15. It should be noted that the main purpose of the latter is to limit the longitudinal sliding of clip 10 inside connector 16 during fitting of tube 18, by abutting against shoulder 25, so as to prevent contact between jaws 14 and the wall 17b opposite the bearing surface 17a in socket 17, which would result in tightening them.

Figure 4:
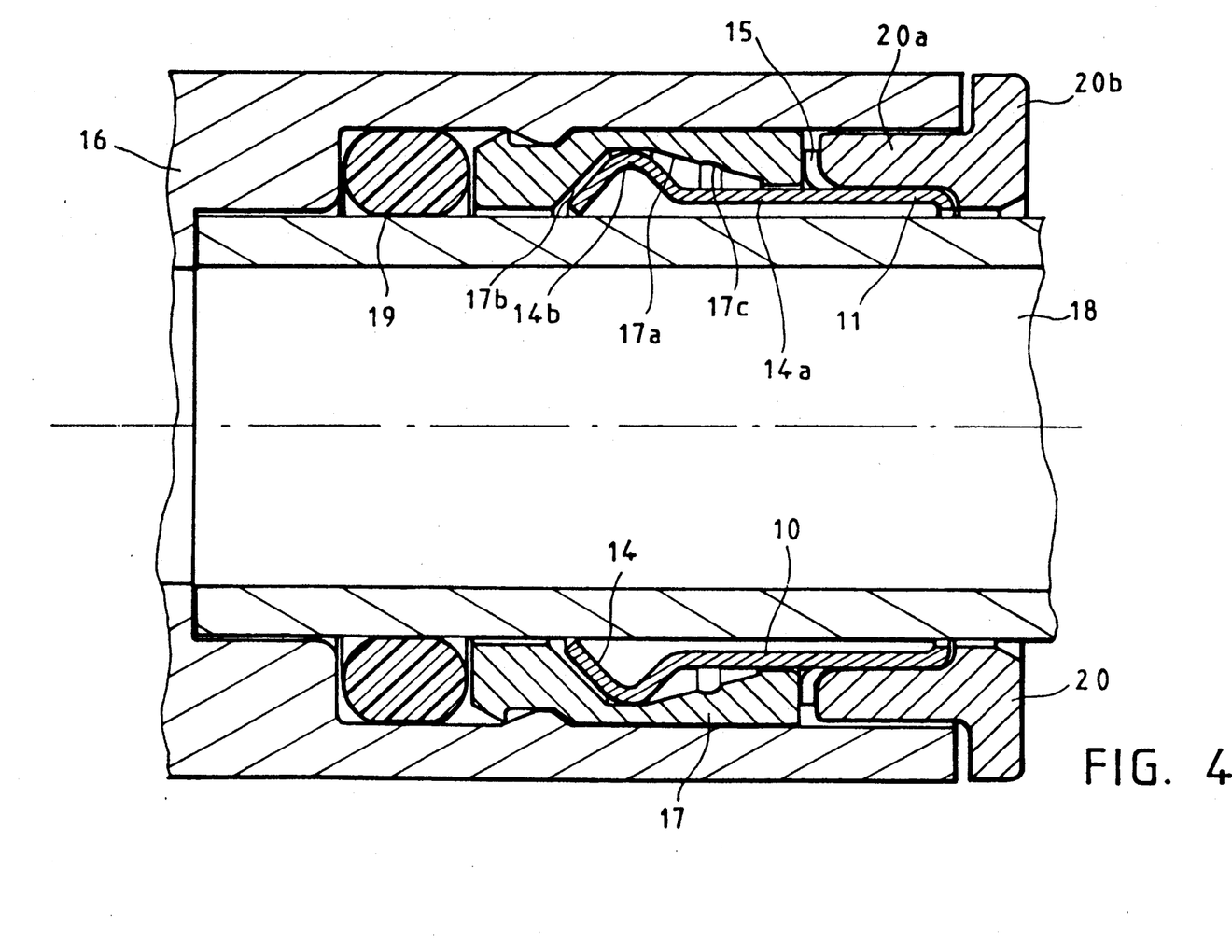
FIG. 4 is an axial sectional view of another instant connector provided with the clip of FIG. 2.

In FIG. 4, socket 17, fixed by snap-fitting, is entirely inside connector 16. It stops just after its constricted portion at the level of tongues 14a of jaws 14.

In the bore of the connector, following socket 17, the front portion 20a of the push ring 20 whose rear portion 20b forms a collar about the orifice is slidingly engaged. As in the embodiment shown in FIG. 3, the base portion 11 of clip 10 is mounted in a reception housing having a shape complementary to that of the push ring 20, spurs bearing against the front edge thereof. Fastening between clip 10 and the push ring 20 results from the fitting together, or preferably it is obtained by bonding.

In the drawings, a circular groove 17c has also been shown formed in the divergent zone 17a of socket 17. Groove 17c is intended to receive the bent portion 14b of jaws 14 at the time of engagement of a tube, so as to form a locking safety device.

Figure 5:
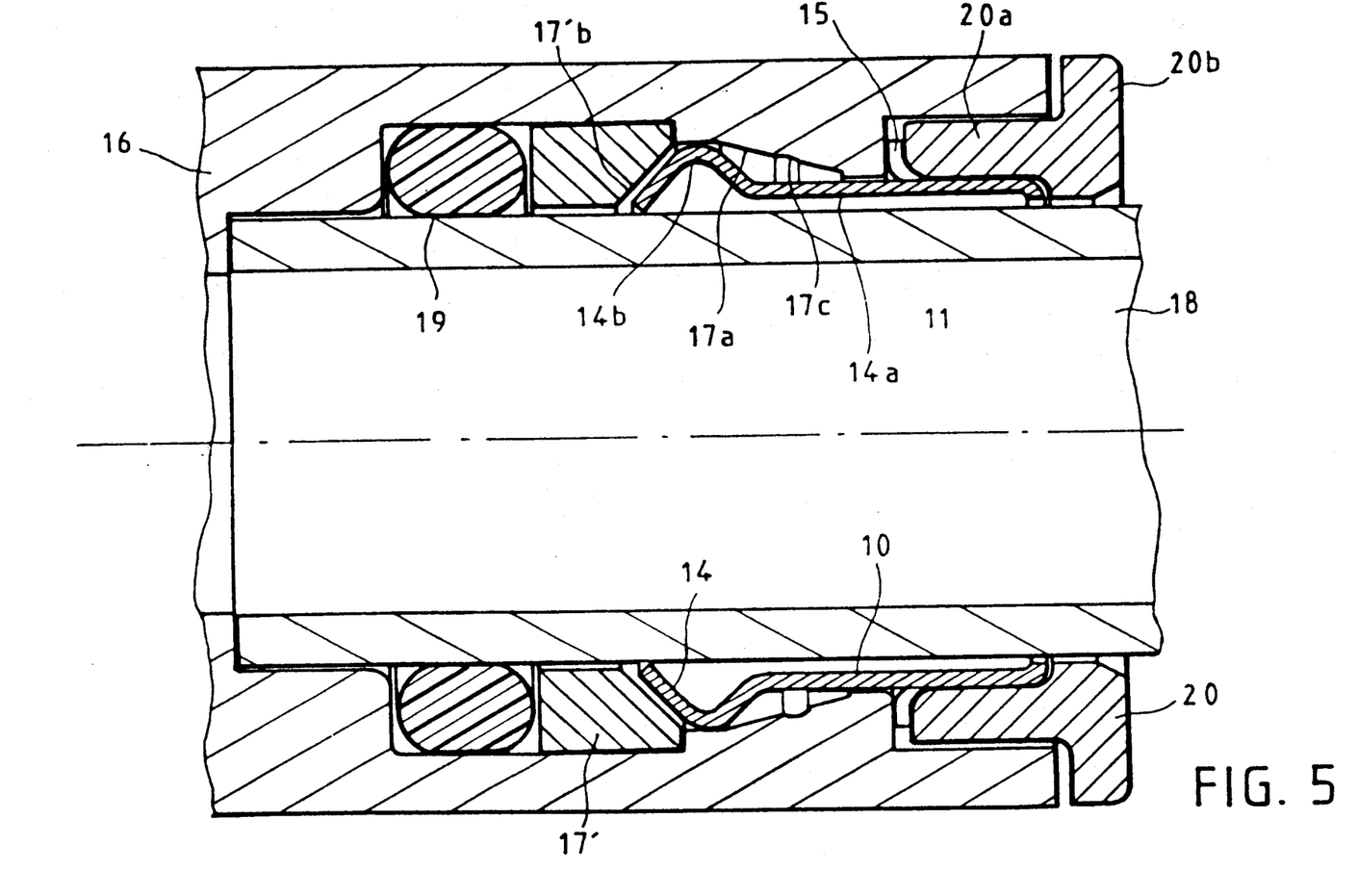
FIG. 5 is an axial sectional view of a first variant of the instant connector of FIG. 4.

In the instant connection device shown in FIG. 5, socket 17 is omitted, wall 17a with groove 17c being formed directly in body 16. A washer 17', introduced into the body 16 by deformation, provides a separation between the space reserved for clip 10 and the chamber housing seal 19. The side of washer 17' turned towards the inlet of the connection defines an annular wall 17'b identical to wall 17b of the above described socket 17.

Figure 6:
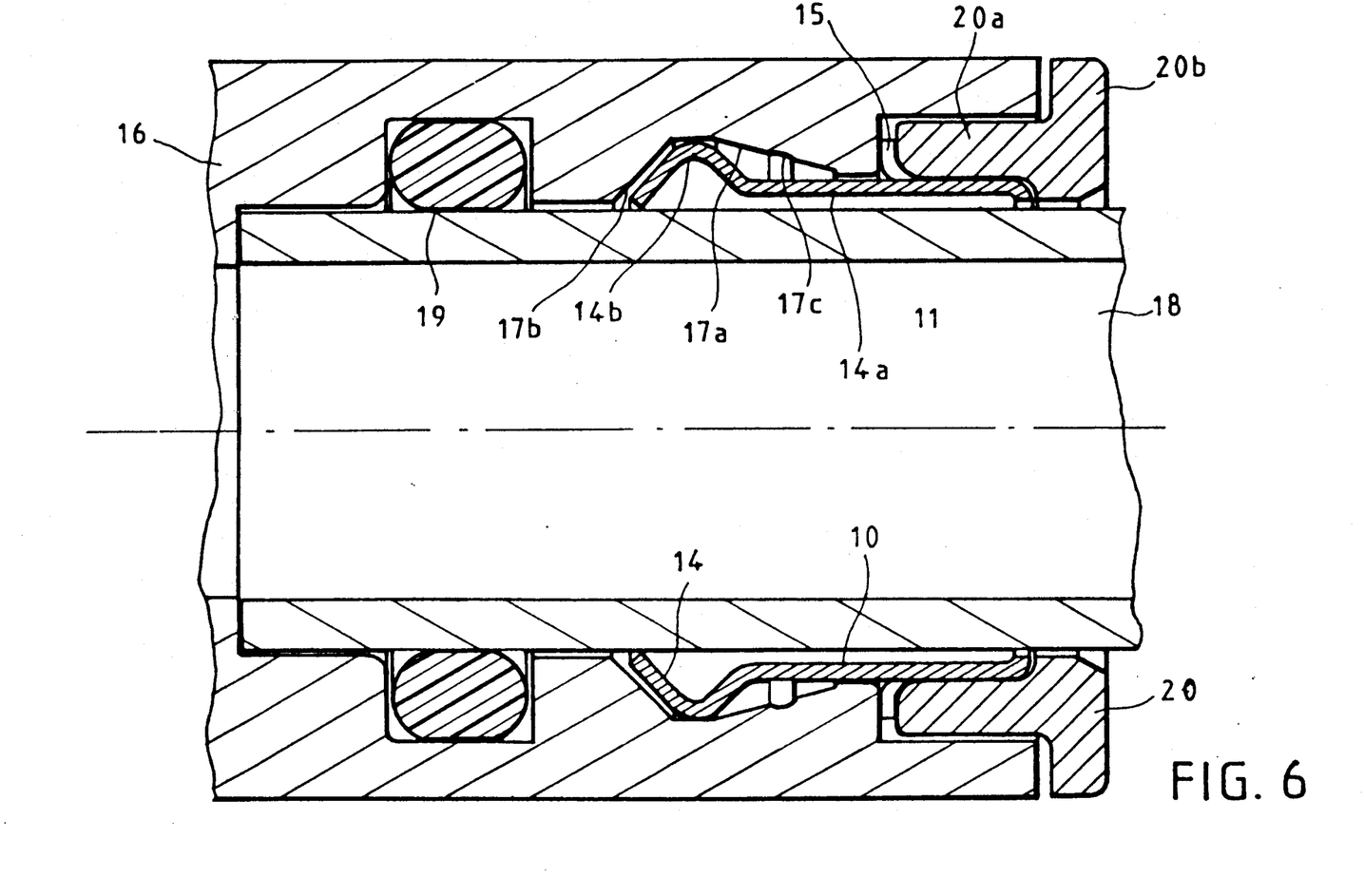
FIG. 6 an axial sectional view of a second variant of the instant connector of FIG. 4.

In the variant of FIG. 6, washer 17' is itself omitted and is replaced by an annular swelling formed inside body 16.

Figure 7:
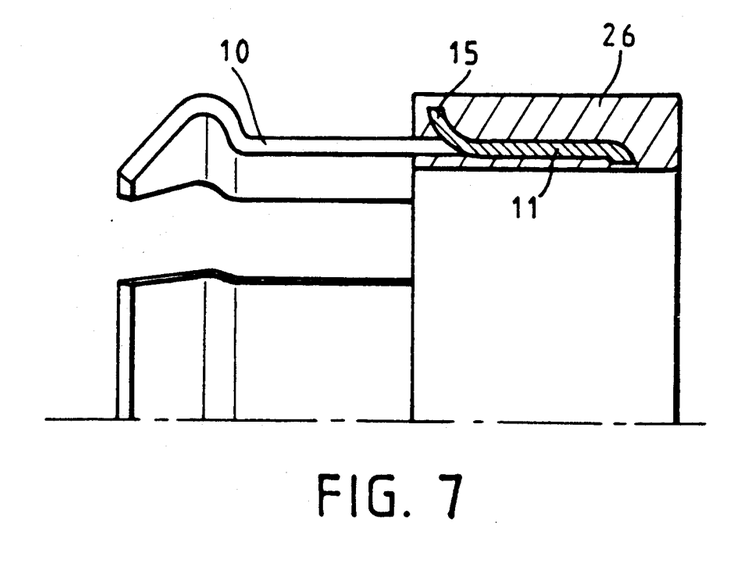
FIG. 7 is a semi axial sectional view of a clip according to the invention, with which a seal is associated.
Figure 8:
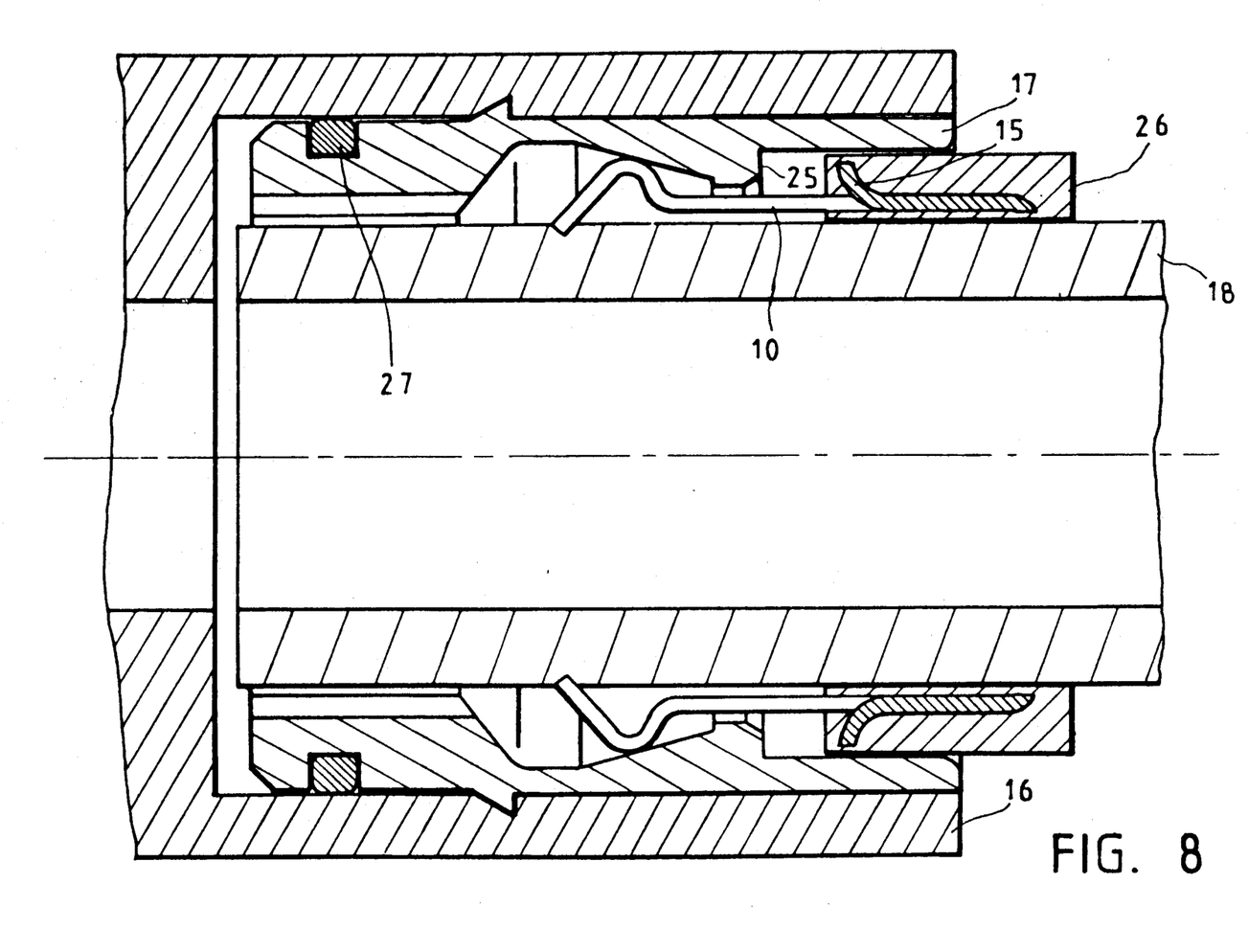
FIG. 8 is an axial sectional view of an instant connector provided with a clip of FIG. 7.

In FIGS. 7 and 8 an elastomer block 26 is associated with clip 10 so as to form a one piece assembly. Block 26 is obtained by moulding over clip 10 which is in all points identical to the above described clip, and it entirely covers portion 11 of the clip as well as spurs 15 which serve for anchoring the moulded material. Block 26 has three functions: by abutment of its internal edge on shoulder 25 it limits the progression of the clip inside the connector at the time of fitting a tube 18; it serves as a push ring for slackening the clip; and it provides the seal between the wall of a tube 18 fitted in the connector and the internal wall of socket 17. The latter function makes it possible to simplify the internal geometry of connection 16 because seal 19 shown in FIG. 3 has become superfluous, only one seal 27 being required between socket 17 and the wall of the bore of connector 16 in which it is inserted.

As can be seen in FIGS. 7 and 8, the thickness of the material forming block 26 is reduced on the internal face of clip 10, because the internal diameter of block 26 must necessarily be very close to that of the clip. For some applications, particularly for obtaining increased flexibility of the block 26 serving as seal about a tube 18, it is advantageous to increase the thickness of material on the internal face of clip 10.

To this end, clip 10 (FIG. 9) is curved longitudinally so that its base portion 11 is substantially widened with respect to its opening diameter defined by edges 14d at the ends of jaws 14 and so that consequently block 26 moulded over clip 10 has substantially the same thickness on each side of the base portion 11. Moreover, the rectilinear portions or tongues 14a of jaws 14 are bent at 14e in the vicinity of the base portion 11 so as to have a front portion 14f forming a substantially cylindrical zone of reduced diameter with respect to that of the base portion 11.

Figure 9:
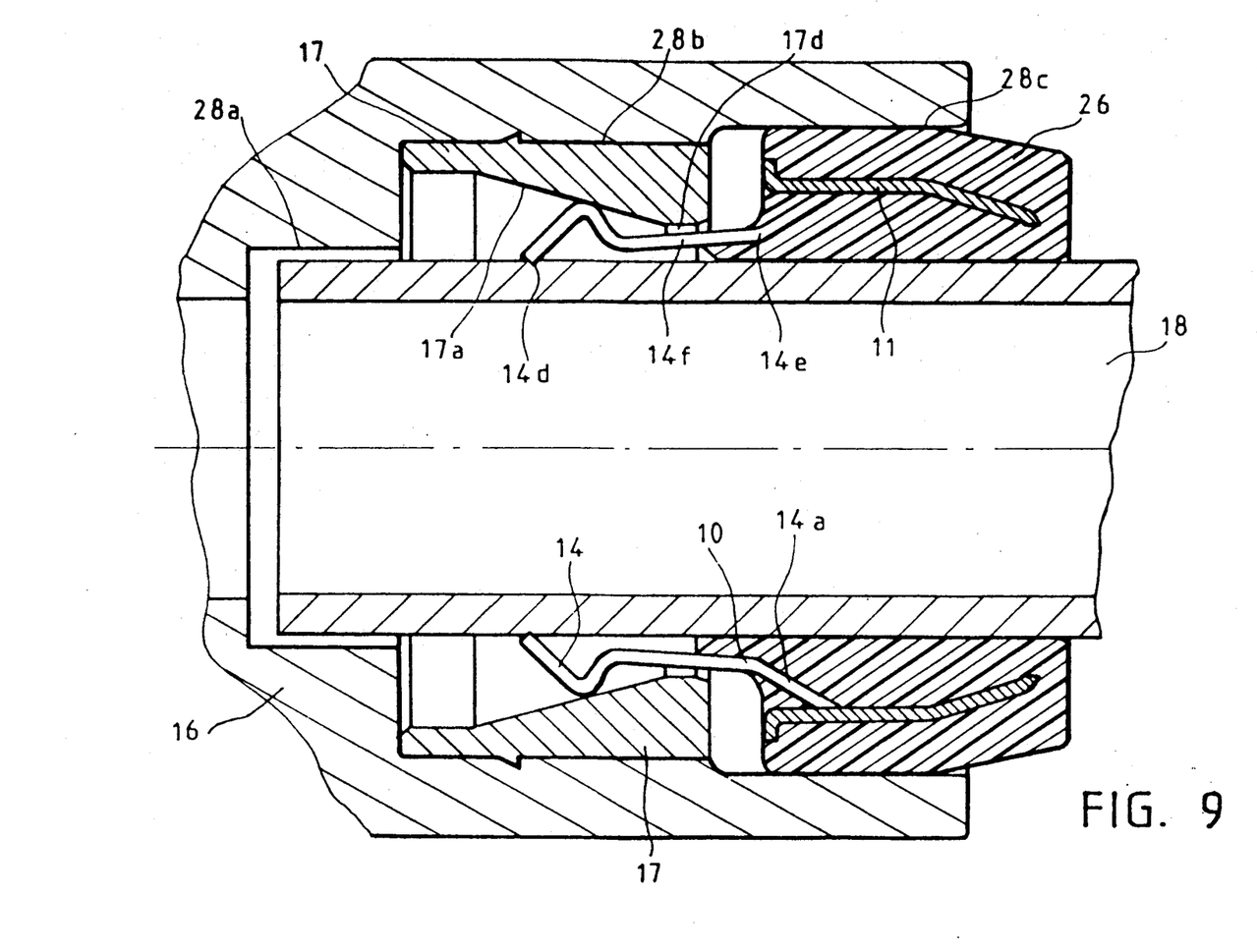
FIG. 9 is an axial sectional view of another instant connector provided with a variant of the clip of FIG. 7.

In FIG. 9, clip 10 and the associated block 26 are mounted in a connection device having on the inside a series of three stepped bores 28a, 28b and 28c with diameters increasing towards the orifice. In the intermediate bore 28b is fitted a socket 17 which stops at the level of the junction between the two bores 28b and 28c. The substantially cylindrical zone of reduced diameter of clip 10, defined by portions 14f of jaws 14, passes freely into its constricted portion 17d.

The inlet bore 28c of connector 16 receives block 26 so that the latter provides sealing between tube 18 and the wall of the bore. With respect to the previously described system in which the seal is provided between tube 18 and socket 17 controlling closure of the clip, seal 27 between the socket and the bore in which it is fitted is omitted.

Figure 10:
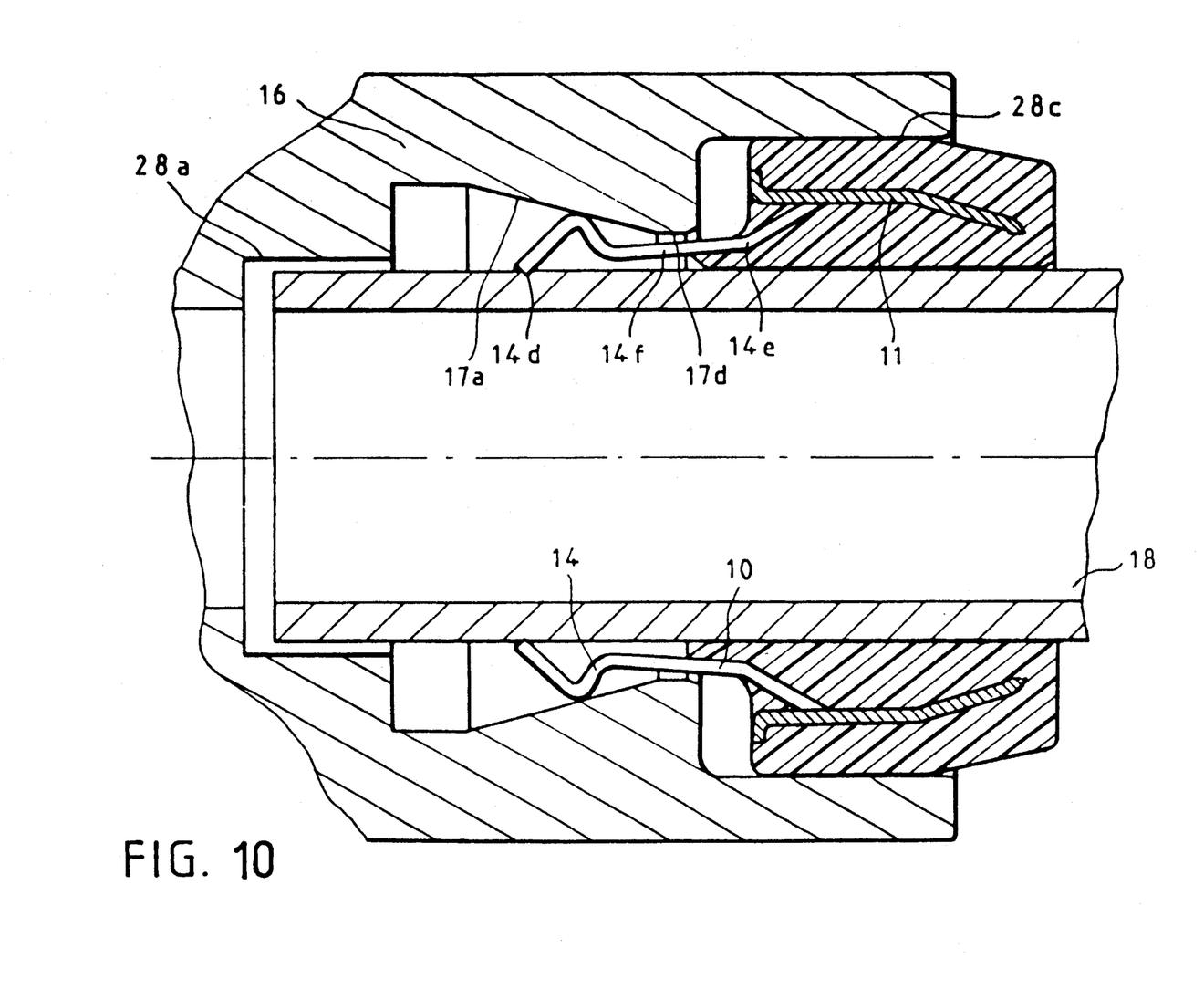
FIG. 10 is an axial sectional view of a variant of the instant connector of FIG. 9.

Compared with this embodiment, the variant of FIG. 10 is remarkable in that the functional portion of socket 17, namely the truncated cone shaped zone, 17a and bore 17b, is formed directly in body 16 of the connector. Thus, the latter is simplified to the utmost since it now comprises only two elements.

In practice, to facilitate the machining work, the blanks from which clips 10 are obtained may be pre-stamped from metal sheets so as to be all joined together by metal strips corresponding in width and angular position to lugs 3 from which spurs 15 are formed, and which are shown schematically in FIG. 1 by the fine dash-dot lines in the extension of the sides of lugs 3.

The clip of the invention is of a very advantageous cost price, both by the simplicity of its manufacture and the material used. Furthermore, the fact of being able to readily determine its mechanical characteristics: flexibility and rigidity of the jaws, by judicious stamping of lugs 4 by adjusting their overall width and/or the more or less pronounced divergence of segments 4a), is also an important advantage, as well as the fact of being able to associate in a single piece and by a single moulding operation the clip and an elastomer block forming seal and push ring at the same time.

I claim:

1. A clip for an instant connection device for a fluid conduit, particularly a semirigid tube, said clip having a general cylindrical configuration with a base portion in the form of a ring extended on one side by flexible jaws whose ends define an annular bearing surface offset outwardly, wherein an inside surface of the ends of said flexible jaws have a circular edge;

wherein said clip is made from a metal sheet blank and said jaws are bended transversely with respect to the plane defined by the metal sheet blank therefor and have a substantially rectilinear portion adjacent to said ring, a longitudinally bent portion to form said bearing surface and an end portion slanted towards a center line of the clip, whose internal edge forms said circular edge;

the jaws are transversally wider in a zone near their free end corresponding to the bent portion than in a zone adjacent to the base portion, so as to be flexible near the base portion and more rigid towards said free end;

said clip further comprising lugs provided between the jaws to form outwardly directed spurs around the clip.

2. Clip according to claim 1, wherein an external edge of said base portion extends inwardly.

3. Instant connection device comprising a clip according to claim 1, characterized in that a push ring (20) and a reception socket (17) are associated with the clip (10) in the connection device (16), the push ring mating by its internal periphery with the shape of the base portion (11) of the clip and comprising a means (21) for sliding of the socket on a collar shaped edge (23) of the socket (17) and a means (24) for limiting the sliding towards the outside.

4. Instant connection device comprising a clip according to claim 1, characterized in that a push ring (20) and a socket (17) controlling the closure of the jaws (14) are associated with the clip (10), the socket (17) being entirely inside the connection device (16), and the push ring (20) mating by its internal periphery with the shape of the base portion (11) of the clip and being secured thereto, the push ring (20) further having a front portion (20a) slidingly engaged in the bore of the connection device following the socket (17).

5. Instant connection device comprising a clip according to claim 1, characterized in that a truncated cone shaped zone (17a) which controls the closure of the clip (10) is formed directly in the body (16), and a washer (17') provides separation between the space reserved for the clip (10) and a chamber housing seal (19) providing sealing about a tube (18) inserted in the connection device.

6. Clip according to claim 1, wherein an elastomer block forming a push ring is associated therewith by molding about said clip and said spurs.

7. Clip according to claim 6, wherein said elastomer block further forms a seal about said tube inserted in the connection device.

8. Instant connection device according to claim 7, wherein a truncated cone shaped zone controlling the closure of the clip is formed directly in the connection device.

9. Instant connection device according to claim 8, wherein the wall of the truncated cone shaped zone controlling the closure of the clip has a circular groove for locking the jaws in the engaged position of the tube.

10. Instant connection device according to claim 7, wherein said elastomer block provides sealing between an input bore of said connection device and said tube introduced into the connection device.

11. Clip according to claim 7, wherein the base portion of said clip is substantially wider with respect to an opening diameter defined by the edges of said jaws, the rectilinear portions of the jaws being bent so that they form, in their front portion, a substantially cylindrical zone of reduced diameter with respect to that of said base portion.

12. Clip according to claim 6, wherein a truncated cone shaped zone which controls the closure of the clip and provides a separation between a space reserved for the clip and a chamber housing seal for providing sealing about said tube inserted in the connection device is formed directly in the body of said connection device.

13. The clip according to claim 1, wherein said jaws comprise lateral edges, each of said lateral edges defining an outwardly divergent portion and a convergent portion so as to form said transversally wider zone.

* * * * *